UNITED STATES PATENT OFFICE.

LEOPOLD OSTERMANN, OF HAMBURG, GERMANY.

PROCESS OF MAKING NEUTRAL OXYCHINOLIN SALTS.

No. 906,918.

Specification of Letters Patent.

Patented Dec. 15, 1908.

Application filed May 25, 1906. Serial No. 318,762. (Specimens.)

*To all whom it may concern:*

Be it known that I, LEOPOLD OSTERMANN, manufacturer, a citizen of the German Empire, residing at Hamburg, Germany, have invented certain new and useful Improvements in Processes of Making Neutral Oxychinolin Salts; and I do hereby declare the following to be a full, clear, and exact description of the invention, such as will enable others skilled in the art to which it appertains to make and use the same.

O-oxychinolin forms salts with acids. Beilstein in his *Handbook of Organic Chemistry*, mentions an acid oxychinolin sulfate, $C_9H_7NOH_2SO_4 2H_2O$. According to the United States Patent No. 466,708, a neutral oxychinolin sulfate, $C_{18}H_{14}N_2O_2H_2SO_4$, is said to be obtained by boiling two molecules of O-oxychinolin and one molecule of sulfuric acid in water solution on a reflux cooler and then distilling off the water in a vacuum. It has been found, however, that in this way no neutral O-oxychinolin sulfate can be obtained by this applicant, as O-oxychinolin is always distilled off with steam or water, whether the process be carried on in a vacuum or at ordinary pressure. The product of the said patent as prepared by this applicant is found to be not neutral oxychinolin sulfate, but a mixture of the acid oxychinolin sulfate with neutral oxychinolin sulfate, out of which it was impossible to regain the pure neutral oxychinolin sulfate itself. The melting point of the product in the U. S. patent is stated to be 172–173°, whereas neutral O-oxychinolin sulfate prepared according to this process melts at 177.5°.

It has been found that by dissolving 2 molecules of oxychinolin in alcohol and then adding one molecule of sulfuric acid there is formed almost immediately a precipitate which is shown by analysis to be di-oxychinolin sulfate, that is neutral sulfate of oxychinolin. If this compound is dissolved in water and the water evaporated either at atmospheric pressure or in a vacuum, the di-oxychinolin sulfate is destroyed; a part of oxychinolin is evaporated with the water vapor and the remainder is a mixture of acid sulfate of oxychinolin, with more or less undestroyed residues of the neutral salt. In consequence of this it has been found that the neutral sulfate of oxychinolin (di-oxychinolin sulfate) is destroyed by the presence of water, dissociating into oxychinolin and the acid sulfate of oxychinolin (mono O-oxychinolin sulfate) so that out of a water solution a part of the oxychinolin may be separated by distillation or by extracting it with ether or benzol. It results that di-oxychinolin sulfate can only be produced in the absence of water, alcohol, for example, being used as a solvent.

Di-oxychinolin sulfate has great value as an antiseptic and it is a necessity of modern progress that such remedies should be prepared in an absolutely constant and pure form. In this respect the above described process is a great technical improvement and it also produces a product hitherto unknown. This product differs from the product of said U. S. Patent No. 466,708, not only in its analysis and higher melting point, 177.5°, but also in its physical appearance and technical properties. It is a very fine crystalline powder which is eminently fitted to be formed into tablets. It is, however, not hygroscopic like the product of the said patent, which consists of a mixture of two different oxychinolin salts.

*Example: Neutral oxychinolin sulfate.*—10.6 parts of sulfuric acid of 65.5° Baumé, 29 parts of oxychinolin and 100 parts of alcohol of 96% are mixed together. The neutral sulfate of oxychinolin crystallizes immediately by cooling when left in a room at the ordinary temperature. Evaporation of the dissolving fluid is not permitted to take place. The product is separated from the fluid by any suitable means, as for instance, a filter press, and dried at a not too high temperature, 55° or 60° C. for example. The yield is the theoretical quantity less four or five per cent. which remain dissolved in the alcohol. The neutral oxychinolin sulfate of the composition $(C_9H_7NO)2H_2SO_4$ is a beautifully yellow crystalline powder, which is not hygroscopic, can readily be formed into tablets, is very easily soluble in water, slightly less so in alcohol and entirely insoluble in absolute ether. Its melting point is 177.5°, by which it easily is distinguished from mixtures of acid sulfate of oxychinolin, whose melting point is about 172°.

Neutral oxychinolin sulfate prepared in the manner above described is neither, as was assumed hitherto, a molecular mixture of free oxychinolin with well known acid salts of the same, nor is the one molecule of oxychinolin loosely combined in well known manner, as "crystal phenol". It is true that exactly one molecule of oxychinolin can be withdrawn from these salts from water solution by such extracting means as ether, benzin, etc., or by means of a steam jet. If, however, the dry salt is treated with ether free from water, or benzin free from water—each of which is a solvent for oxychinolin—then it is impossible to withdraw oxychinolin from the salt. It follows therefore that in the present case there is produced a genuine neutral oxychinolin salt which, in water solution, disassociates into acid oxychinolin salt and free oxychinolin. From the two molecules of oxychinolin taken up, exactly one molecule is split off. The chemical equation is as follows:—

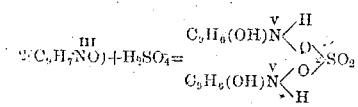

I claim:—

1. The process of manufacturing neutral sulfate of oxychinolin (di-oxychinolin sulfate) which consists in mixing together sulfuric acid and the corresponding molecular quantity of oxychinolin, dissolving the same in alcohol and allowing the neutral sulfate of oxychinolin to crystallize out, substantially as described.

2. The process of manufacturing neutral sulfate of oxychinolin (di-oxychinolin sulfate) which consists in mixing together 10.6 parts of sulfuric acid of 65.5° Baumé and 29 parts of oxychinolin in 100 parts of 96% alcohol and allowing the neutral sulfate of oxychinolin to crystallize out, substantially as described.

In testimony whereof, I have affixed my signature, in presence of two witnesses.

LEOPOLD OSTERMANN.

Witnesses:
 JOHN F. SUHR,
 I. CHRIST. HAFERMANN.